J. C. YEARKE.
PIPE COUPLING.
APPLICATION FILED FEB. 15, 1909.
943,330.
Patented Dec. 14, 1909.
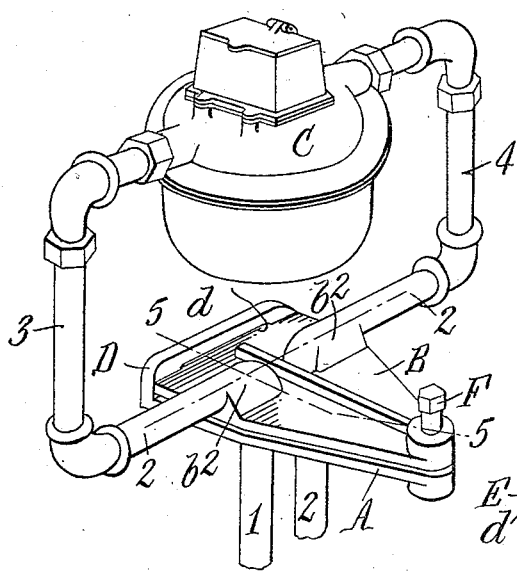
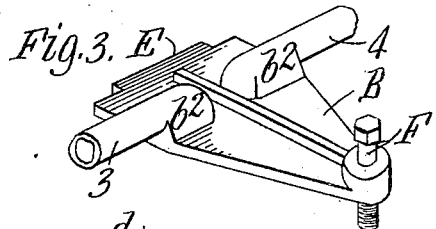
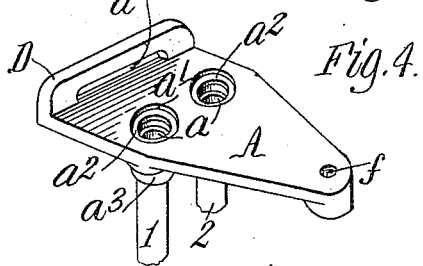
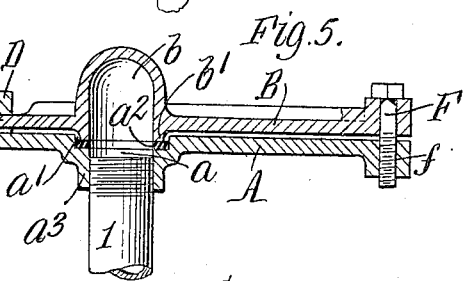
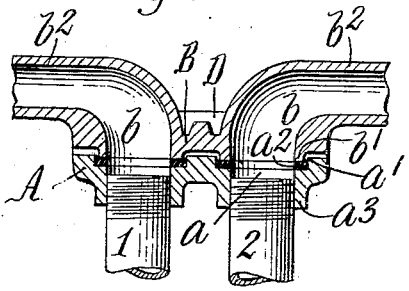
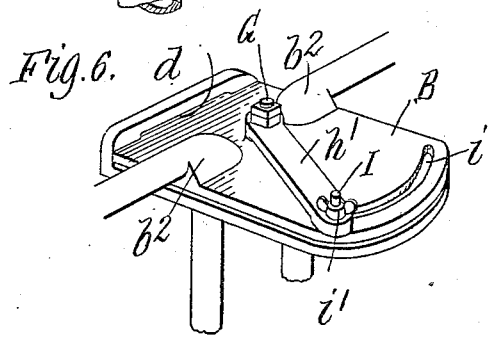
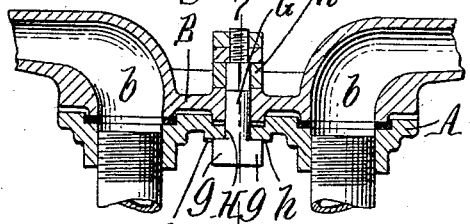
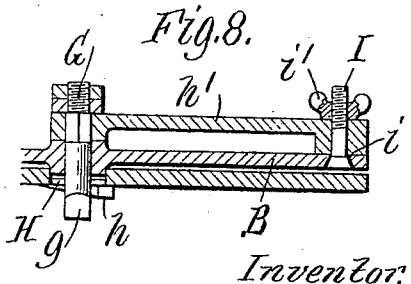
Witnesses:
C. H. Bund
E. A. Vilk
Inventor:
John C. Yearke,
by Wilhelm, Parker & Hard,
Attorneys.

UNITED STATES PATENT OFFICE.

JOHN C. YEARKE, OF BUFFALO, NEW YORK, ASSIGNOR OF ONE-HALF TO ALBERT F. YEARKE, OF BUFFALO, NEW YORK.

PIPE-COUPLING.

943,330.  Specification of Letters Patent.  Patented Dec. 14, 1909.

Application filed February 15, 1909. Serial No. 477,973.

*To all whom it may concern:*

Be it known that I, JOHN C. YEARKE, a citizen of the United States, residing at Buffalo, in the county of Erie and State of New York, have invented a new and useful Improvement in Pipe-Couplings, of which the following is a specification.

This invention relates to improvements in pipe couplings or connections which are particularly intended for connecting supply pipes with water meters which are ordinarily located in meter boxes sunk in the ground so that the meter is more or less inaccessible.

The object of this invention is to provide a coupling or connection for this purpose of simple and compact construction which constitutes a supporting base for the meter and enables the meter to be readily connected to and disconnected from the supply pipes without disturbing or moving the meter from its position upon the supporting base, so that it is not necessary to hold or support the meter while connecting and disconnecting it.

In the accompanying drawings: Figure 1 is a perspective view of a meter and a coupling or connection for the same embodying the invention. Fig. 2 is a cross section of the coupling, on an enlarged scale, on line 2—2, Fig. 1. Fig. 3 is a perspective view of the top member of the coupling. Fig. 4 is a perspective view of the bottom member of this coupling. Fig. 5 is a longitudinal sectional elevation of the coupling, on an enlarged scale, on line 5—5, Fig. 1. Fig. 6 is a perspective view of a coupling of modified construction. Fig. 7 is a cross-section thereof. Fig. 8 is a fragmentary sectional elevation thereof on line 7—7, Fig. 7.

Like reference characters refer to like parts in the several figures.

The coupling or connection comprises a lower plate or member A which is connected with the service pipes 1 and 2, and an upper plate or member B which is connected with a meter C by the pipes 3 and 4. The plates are preferably of corresponding shape and size and are arranged one upon the other, the lower plate acting as a seat and support for the upper plate and the meter carried thereby.

The lower plate A is provided with openings $a$ $a$ surrounded on the upper face of the plate with annular depressions $a'$ for receiving a packing $a^2$ of some suitable material, and having on the lower or under face threaded bosses or nipples $a^3$ in which the service pipes 1 and 2 are screwed.

The upper plate B is provided with openings $b$ $b$ which are adapted to register with the openings $a$ $a$ of the lower plate when the upper plate is placed in position on the lower plate, and these openings are provided with annular lips $b'$ which are adapted to enter the depressions $a'$ around the openings $a$ $a$ in the lower plate and bear on the packing $a^2$.

The pipes 3 and 4 connecting the upper plate to the meter are preferably formed by sections $b^2$ integral with the plate B, extending laterally in opposite directions from the openings $b$ $b$ and suitable elbows and connections joining the sections $b^2$ with the opposite sides of the meter C. The meter C is preferably supported by these connections directly above the plate B so that this plate forms a boss for the meter and when simply placed on the lower plate A and before it is secured thereto it will support the meter in proper position.

For securing the plates A and B together to form a detachable coupling or connection between the service pipes and the meter, the following means is preferably employed, see Figs. 1–5.

The plate A is provided at one end with an upturned lug or projection D which has a longitudinal opening $d$ adjacent to the face of the plate, and the plate B has at one end an extension or tongue E which is adapted to fit snugly within the opening $d$, while at its opposite end the plate B is provided with a bolt F which has screw-threaded engagement with a hole $f$ in the corresponding end of the plate A. In uniting the plates to form the connection, it is only necessary to place the upper plate upon the lower plate with the openings of the plates in register and the tongue E in engagement with the slot $d$. The bolt F may then be turned to draw the two plates tightly together, thereby forcing the lips $b'$ of the upper plate into snug engagement with the packing $a^2$ in the depressions $a'$ of the lower plate and forming water tight joints between the plates. In disconnecting the plates, the bolt F is released from engagement with the lower plate and the upper plate and its meter may then be easily removed.

The upper plate and its meter rest upon and are supported by the lower plate and in connecting and disconnecting the plates it is not necessary to turn or disturb the meter, and there is thus no strain upon the meter or its connections such as frequently occurs in constructions where the coupling can only be released by turning the meter. The meter is generally located in the lower portion of a narrow upright meter box which is sunk in the ground. The bolt F which connects the plates of the coupling has its head exposed on the upper face of the upper plate where it can be readily reached and turned from the top of the meter box by a long wrench, for connecting and disconnecting the plates of the coupling, and as the coupling forms a supporting base for the meter, it is not necessary to provide any means for holding and supporting the meter while turning the bolt for connecting and disconnecting the coupling.

In Figs. 6, 7, and 8 is shown a modified construction for detachably securing the two plates of the coupling together. This modification consists in providing the plate B with a connecting bolt G located centrally therein between the openings b b and provided at its lower end with oppositely extending lateral projections or lugs g having upwardly directed cam faces. The plate A has an elongated opening H for receiving the end of the bolt G with its lugs and is provided on opposite sides of this opening with downwardly directed cam faces h adapted to be engaged by the faces of the bolt G when the latter is turned after having been inserted in the opening H, to draw the plates together. As shown, the bolt is provided with an arm h' which extends horizontally therefrom above the plate B and is furnished at its outer end with a suitable clamping bolt I which is secured in a curved slot i in the plate B and extends through this slot and the end of the arm h', being provided at its outer end with a thumb nut i' by means of which the arm h' can be clamped against the base B to hold the bolt F in its locked position.

I claim as my invention:

1. A pipe coupling or connection for meters comprising a lower horizontal member, an upper horizontal member adapted to rest upon the lower member and forming a supporting base for the meter, service pipes connected to the lower member, pipes connecting the upper member with the meter and registering with the service pipes, and detachable interlocking connections between the upper and lower members which are arranged on opposite sides of said pipes, one of said connections being exposed at one side of said meter, substantially as set forth.

2. A pipe coupling or connection for meters comprising a lower horizontal member, an upper horizontal member adapted to rest upon the lower member and forming a supporting base for the meter, service pipes connected to the lower member, pipes connecting the upper member with the meter and registering with the service pipes, and means for detachably connecting said members which is exposed on the upper side of the upper member at one side of said meter, substantially as set forth.

3. A pipe coupling or connection for meters comprising a lower horizontal member, an upper horizontal member adapted to rest upon the lower member and forming a supporting base for the meter, service pipes connected to the lower member, pipes connecting the upper member with the meter and registering with the service pipes, and detachable interlocking connections between the opposite ends of the upper and lower members, substantially as set forth.

4. A pipe coupling or connection for meters comprising a lower horizontal member, an upper horizontal member adapted to rest upon the lower member and forming a supporting base for the meter, service pipes connected to the lower member, and pipes connecting the upper member with the meter and registering with the service pipes, said members having integral interlocking portions at one end and a detachable connection at the opposite end which is exposed upon the upper side of the upper member, substantially as set forth.

5. A pipe coupling or connection for meters comprising a lower horizontal member, an upper horizontal member adapted to rest upon the lower member and forming a supporting base for the meter, service pipes connected to the lower member, and pipes connecting the upper member with the meter and registering with the service pipes, said lower member being provided at one end with an upturned lug having an opening therein and said upper member having at its corresponding end a tongue which is adapted to fit within said opening for locking said ends together, and means for detachably connecting the opposite ends of said members, substantially as set forth.

Witness my hand in the presence of two subscribing witnesses.

JOHN C. YEARKE.

Witnesses:
EDWARD C. HARD,
C. B. HORNBECK.